US006558047B1

United States Patent
Tran et al.

(10) Patent No.: US 6,558,047 B1
(45) Date of Patent: May 6, 2003

(54) COLD WELDING PROCESS FOR FIBER OPTIC/FERRULE ATTACHMENT

(75) Inventors: Dean Tran, Westminster, CA (US); Jack S. McLaren, San Pedro, CA (US); David M. Hernandez, Torrance, CA (US); Michelle M. Hazard, Huntington Beach, CA (US); Sonny D. Le, Garden Grove, CA (US); Christian L. Marquez, Redondo Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 10/001,539

(22) Filed: Nov. 14, 2001

(51) Int. Cl.[7] .................................................. G02B 6/36
(52) U.S. Cl. ......................................................... 385/78
(58) Field of Search ............................... 385/76, 77, 78, 385/80, 84, 139

(56) References Cited

U.S. PATENT DOCUMENTS 6,220,766 B1 * 4/2001 Yeandle et al. ................ 385/94
6,275,369 B1 * 8/2001 Stevenson et al. .......... 361/302

OTHER PUBLICATIONS

Mobarhan, Kamran S.: Hagenbuechle, Martin; and Heyler, Randy; Application Note No. 6 "Fiber to Waveguide Alignment Algorithm", pp. 1–5. No date.

Mobarhan, Kamran S.; Jang, Soon and Heyler, Randy; Application Note No. 7 "Laser Diode Packaging Technology: Coaxial Module Assembly", pp. 1–7. No date.

Conner, Rick, Application Note No. 8 "MEMS/MEOMS—Metrology & Machine Vision", pp. 1–9 No date.

* cited by examiner

Primary Examiner—Javaid Nasri
(74) Attorney, Agent, or Firm—Harness, Dickey & Pierce, P.L.C.

(57) ABSTRACT

A cold welding technique for securing a fiber optic cable (10) to a ferrule (26). The fiber optic cable (10) is inserted into a sleeve (12). The fiber cable and sleeve assembly is then slid into a sleeve bore (24) through one end of the ferrule (26) so that the fiber (14) extends out of an opposite end (40) of the ferrule (26). The sleeve (12) is then retracted from the ferrule (26). A cold electroplating process is performed so that a layer (50) of a suitable plating material is deposited over the end (40) of the ferrule (26) through which the fiber (14) extends so that the fiber cable (10) is held within the ferrule (26) and the ferrule opening is hermetically sealed. The sleeve (12) is then slid back into the ferrule (26) and is soldered to the ferrule to hold it in the desired location.

15 Claims, 6 Drawing Sheets

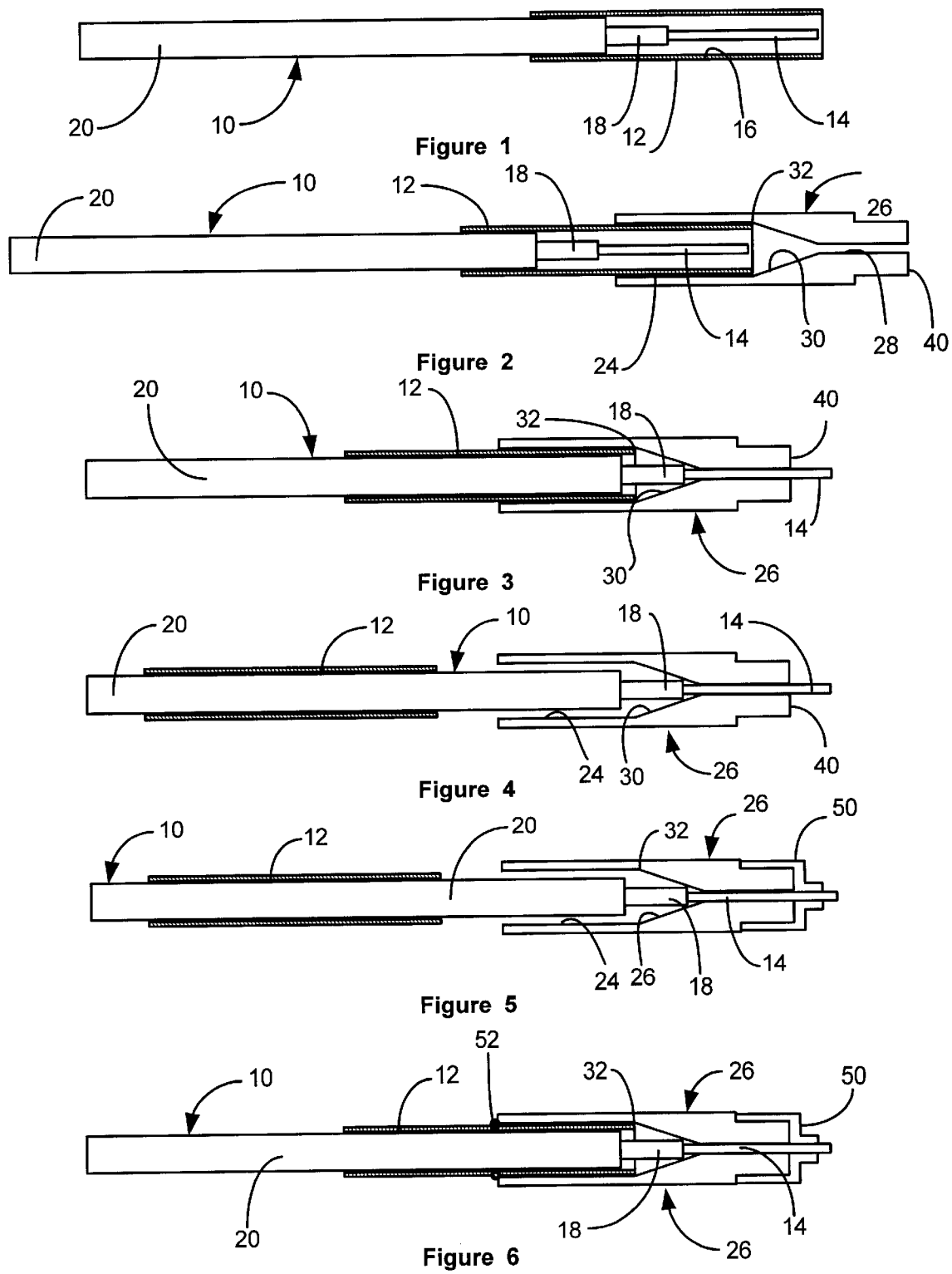

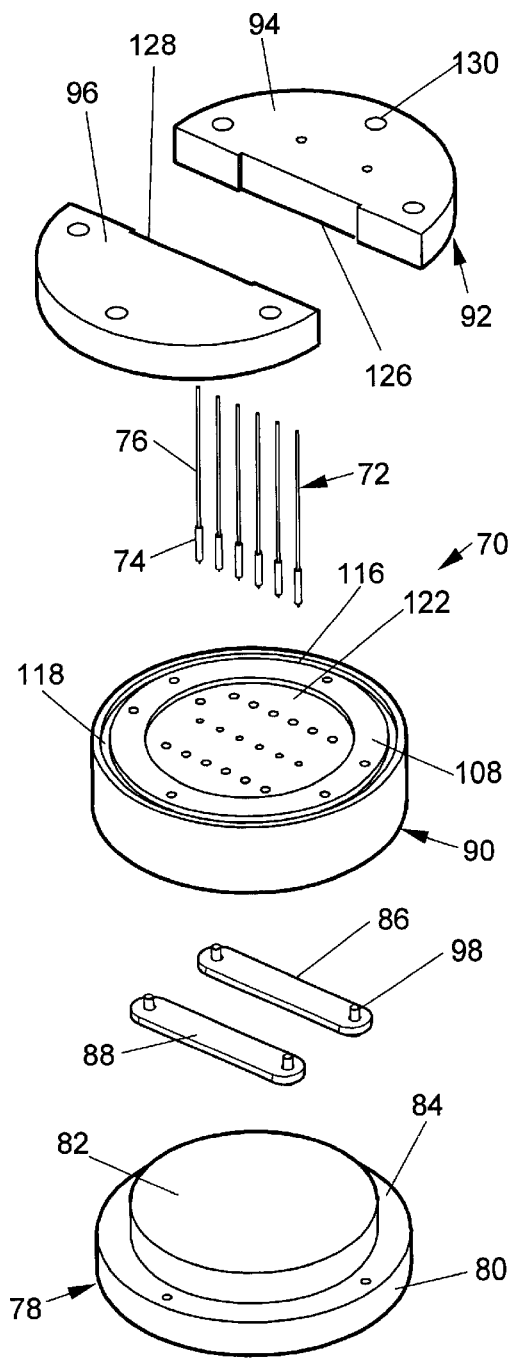
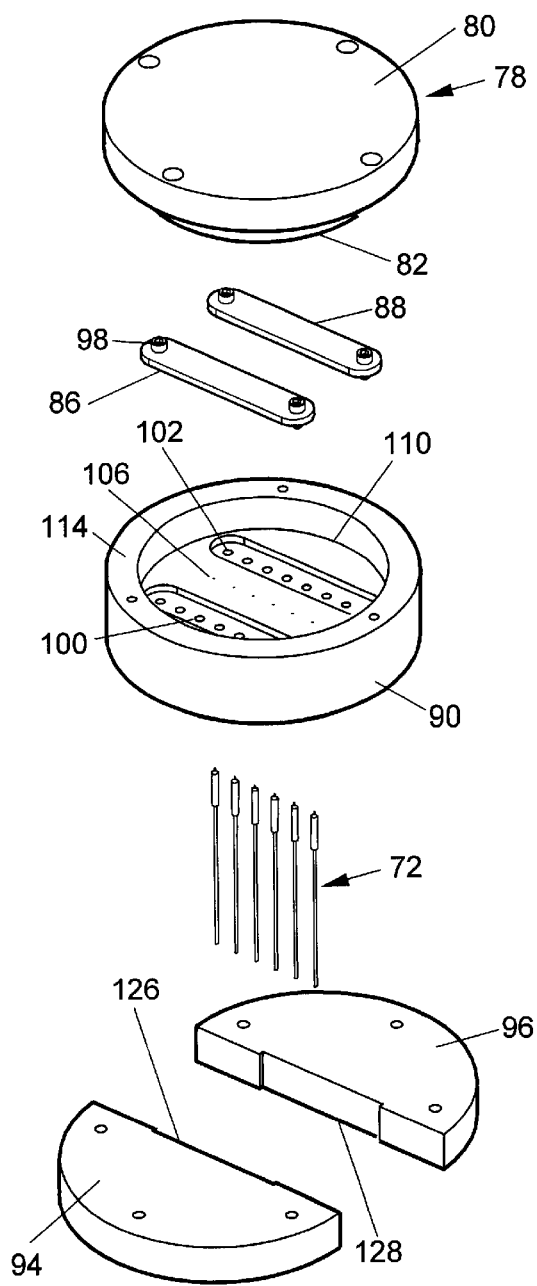
Figure 8
Figure 9

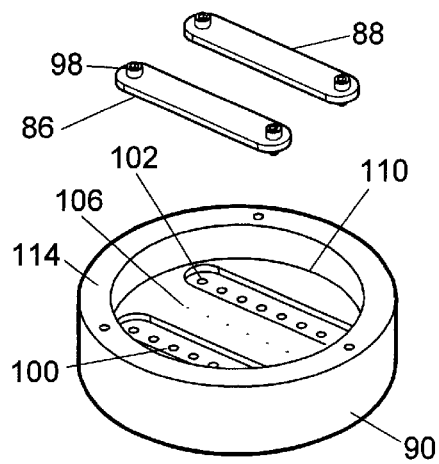
Figure 10
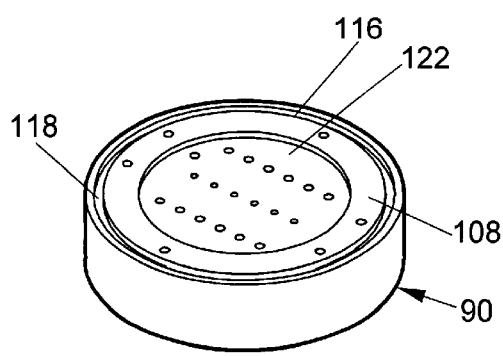
Figure 11
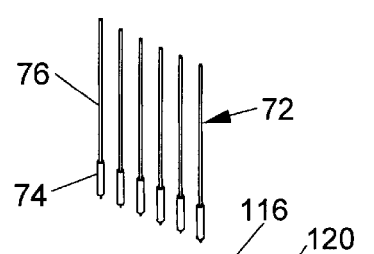
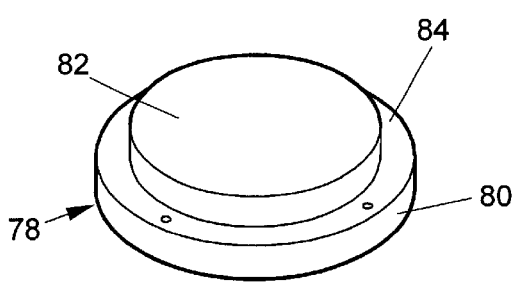
Figure 12

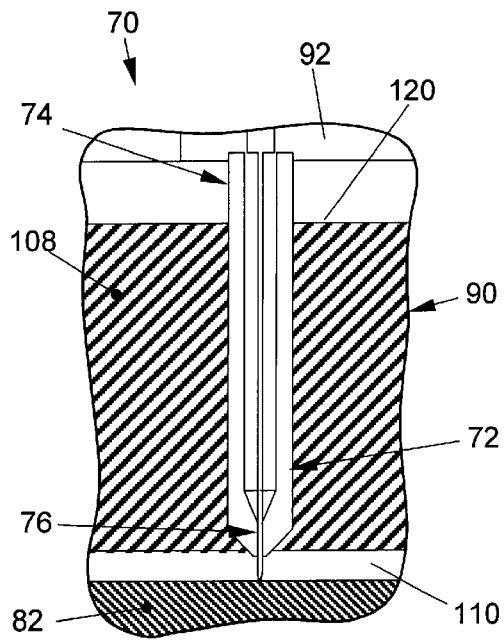
Figure 13
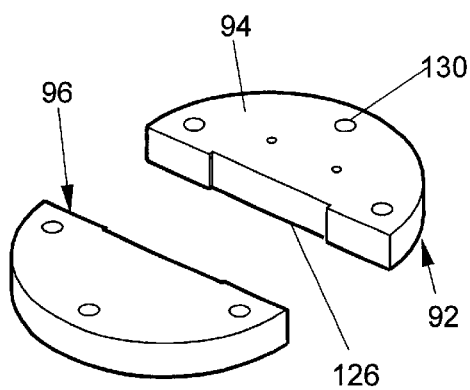
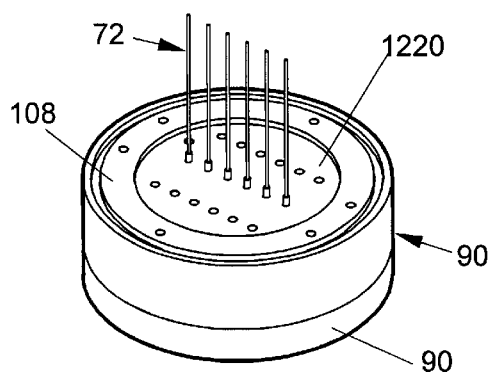
Figure 14
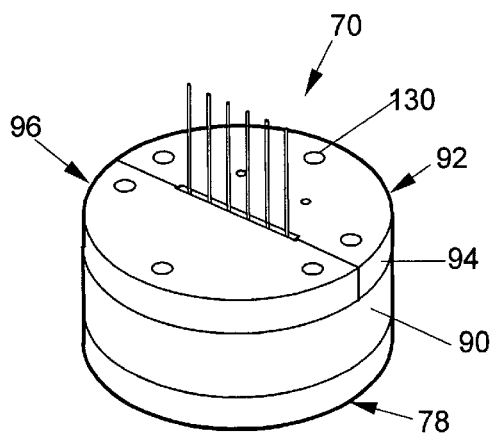
Figure 15

COLD WELDING PROCESS FOR FIBER OPTIC/FERRULE ATTACHMENT

BACKGROUND OF THE INVENTION

1. Field of the Invention

This invention relates generally to a technique for attaching a ferrule to a fiber optic cable and, more particularly, to a technique for attaching a ferrule to a fiber optic cable that employs a cold welding operation.

2. Discussion of the Related Art

Certain photonic devices, such as photodetectors, laser diodes and optical modulators, are sometimes mounted within a housing or device module as part of a device package assembly. A fiber optic cable, including a coaxially formed fiber jacket and optical fiber, is mounted to the module and is aligned with the photonic device. The optical fiber either delivers an optical signal to the photonic device or receives an optical signal generated by the optical device for transmission. The optical fiber can be a single mode fiber, and sometimes a polarization maintaining single mode fiber, requiring high precision optical coupling between the photonic device and the optical fiber, sometimes with submicron accuracy. Sometimes a lens is employed between the photonic device and the optical fiber to provide efficient optical coupling therebetween to reduce optical losses. The fiber optic cable is sometimes attached to a specialized optical adaptor outside the module to be coupled to a suitable optical system.

Because the cable is flexible and has a very small diameter, a ferrule is used to hold the fiber at the desired location to provide proper alignment between the photonic device and an end of the optical fiber. The fiber cable is inserted into the ferrule so that the optical fiber extends out of an end of the ferrule. The ferrule is then positioned within an orifice in the module and mounted thereto so that an end of the fiber is positioned proximate to and aligned with the photonic device. When the fiber is in the desired location, the ferrule is secured to the module by laser welds or by epoxy. Automated alignment and laser welding systems are known in the art, such as the Newport Corporation laser weld work station (LWWS), that provide the desired alignment accuracy. The fiber optic cable is secured to the ferrule and the ferrule is secured to the module in a manner that provides a hermetic seal so that the photonic device is not contaminated by the environment.

Various techniques are known in the art for securing the fiber optic cable to the ferrule. One conventional technique is to glue the fiber optic cable to the ferrule with an epoxy that contains an organic resin. The epoxy is cured at a temperature of approximately 150–165° C. to provide the bond. However, the heat of the curing process acts to deteriorate the fiber jacket around the optical fiber which reduces fiber protection. Additionally, the curing process causes the organic resin to generate out-gassing into the ferrule which decreases it hermetic integrity.

To overcome the drawbacks of the epoxy process, it is known to employ a soldering technique to secure the fiber optic cable to the ferrule, where the ferrule is soldered to the optic fiber cable. However, the soldering technique dissipates heat from the soldering point to the fiber jacket that causes the jacket polymer to melt and deform reducing its integrity. Further, both the epoxy technique and the soldering technique are labor intensive, increasing the manufacturing costs.

SUMMARY OF THE INVENTION

In accordance with the teaching of the present invention, a cold welding technique is employed for securing a fiber optic cable to a ferrule. The fiber optic cable is inserted into a sleeve so that an end of an optical fiber therein is substantially flush with an end of the sleeve. The fiber optic cable and sleeve assembly is then slid into a sleeve bore through one end of the ferrule so that the fiber is aligned with a narrow fiber bore in the ferrule. The fiber cable is then pushed through the sleeve so that the fiber extends through the fiber bore and out of an opposite end of the ferrule. The sleeve is then retracted from the ferrule while maintaining the relative positions of the ferrule and the fiber optic cable. The sleeve, ferrule and fiber cable assembly is then mounted in a fixture that is immersed in a cold plating bath. The cold plating process is performed so that a layer of a suitable plating material is deposited over the end of the ferrule through which the fiber extends so that the fiber optic cable is held within the ferrule, and the ferrule is hermetically sealed. The sleeve is then slid back into the ferrule, and is optically soldered to the fiber jacket of the cable to hold it in the desired location. dr Additional objects, advantages and features of the present invention will become apparent from the following description and appended claims, taken in conjunction with the accompanying drawings.

BRIEF DESCRIPTION OF THE DRAWINGS

FIGS. 1–6 show an assembly process for securing a fiber optic cable to a ferrule employing a cold plating technique, according to an embodiment of the present invention;

FIG. 8 is an exploded perspective view of a fixture employed in the cold plating technique of the invention;

FIG. 9 is a reverse exploded perspective view of the fixture shown in FIG. 8;

FIGS. 10–14 show various views of some of the components of the fixture shown in FIGS. 8 and 9;

FIG. 15 is a perspective view of the assembled fixture; and

DETAILED DESCRIPTION OF THE EMBODIMENTS

Figure 7:
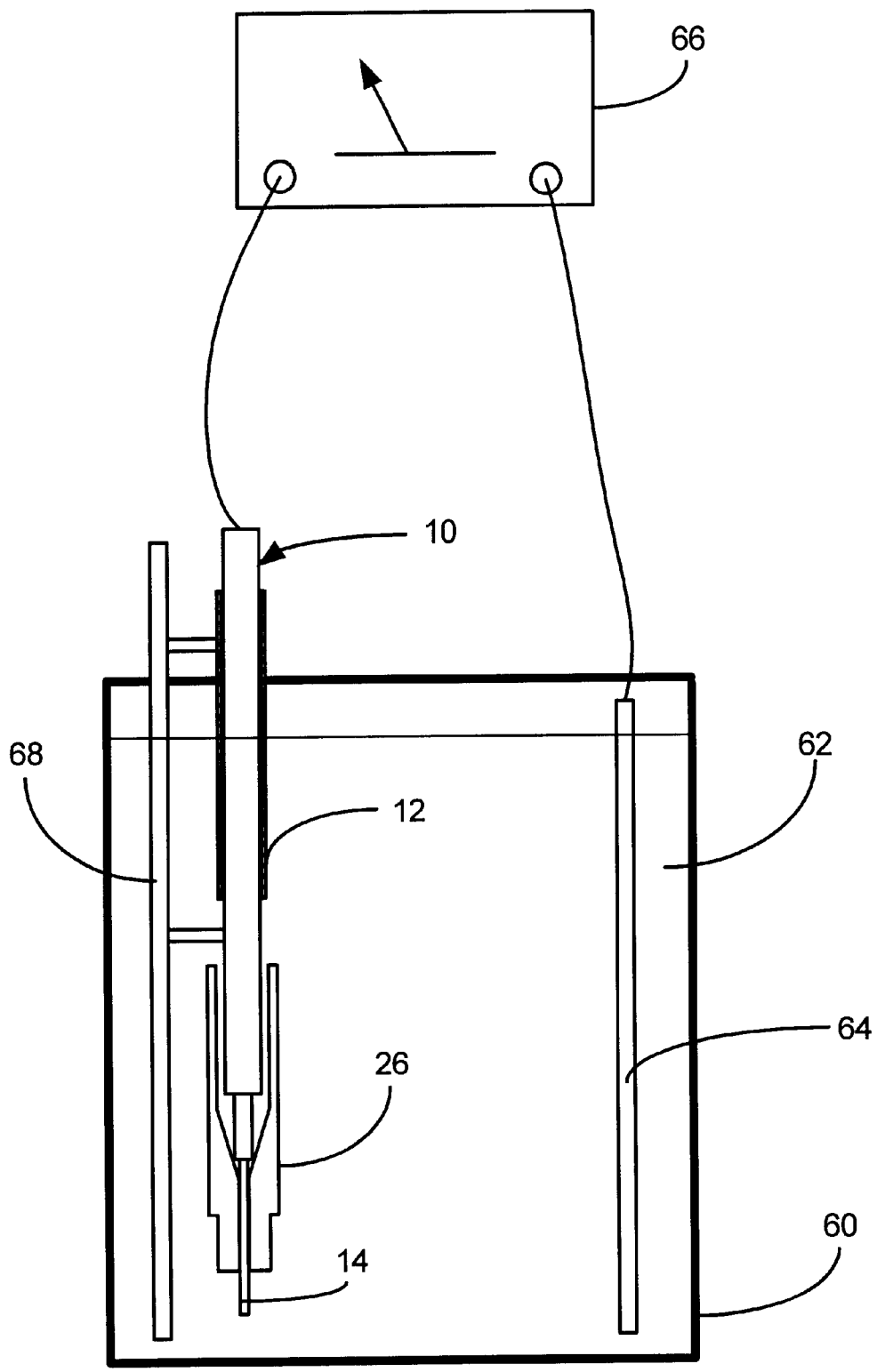
FIG. 7 is a plan diagram showing the assembled optical cable and ferrule immersed within a cold plating bath.

The following discussion of the embodiments of the invention directed to a cold plating process for securing a fiber optic cable to a ferrule is merely exemplary in nature, and is in no way intended to limit the invention or its applications or uses.

FIG. 1 is a length-wise, cross-sectional view of a fiber optic cable 10 positioned within a sleeve 12. The cable 10 includes an optical fiber 14 having a core and cladding layer, a fiber buffer layer 18 and a fiber jacket 20, all being coaxial therewith as shown. In this embodiment, the fiber 14 is a single mode fiber in that it transmits a single mode of light. As is known in the art, the cladding layer has an index of refraction that is less than the index of refraction of the core so that light entering the core at a certain angle of incidence or below is trapped therein by the cladding layer. The sleeve 12 is a tube having an internal bore 16 and is made of a suitable material, such as glass, metal or a ceramic.

The buffer layer 18 and the fiber jacket 20 are protective layers formed over the fiber 14. In one embodiment, the fiber 14 is doped glass and the buffer 18 and the jacket 20 are made of a suitable protective material, such as a polymer (acrylate polymer, Teflon™, etc.). As shown, the outer diameter of the jacket 20 is about the same as the inner diameter of the internal bore 16 of the sleeve 12. Thus, when the fiber optic cable 10 is slid into the sleeve 12, it is held in a certain location for alignment purposes. The end of the fiber 14 is substantially flush with an end of the sleeve 12, and does not extend out of the sleeve 12.

FIG. 2 shows the fiber optic cable and sleeve assembly inserted into a sleeve bore 24 through one end of a ferrule 26. The ferrule 26 can be made of any suitable material, such as Kovar, copper, metalized glass, ceramic, etc., as is known in the art. The ferrule 26 has one suitable shape shown here, however, can have other suitable shapes in other embodiments. In this configuration, the fiber 14 aligns with a fiber bore 28 extending through an opposite end of the ferrule 26. The sleeve bore 24 and the fiber bore 28 are coaxial with each other, and are connected by a tapered bore 30 therebetween, as shown. The transition between the sleeve bore 24 and the tapered bore 30 defines an edge 32 therebetween. The sleeve 12 is slid into the sleeve bore 24 until an end of the sleeve 12 contacts the edge 32.

FIG. 3 shows the fiber cable 10 pushed through the sleeve 12 so that the fiber 14 goes through the fiber bore 28 and extends out of an end 40 of the ferrule 26, as shown. The sleeve 12 is maintained in place because it is forced against the edge 32. The buffer layer 18 is pushed against the tapered bore 30, as shown, in this configuration. A length of the fiber 14 is exposed from the buffer layer 18 a predetermined amount so that when the fiber cable 10 is pushed through the sleeve 12 and the buffer layer 18 contacts the tapered bore 30, the fiber 14 extends out of the end 40 of the ferrule 26 a predetermined distance suitable for an electroplating process, as will be discussed below. Once the optical fiber 14 is pushed through the sleeve 12, as shown in FIG. 3, the sleeve 12 is retracted from the ferrule 26 so that it is outside of the ferrule 26, as shown in FIG. 4.

According to the invention, a cold welding or electroplating process is performed to hermetically seal the fiber bore 28 and hold the cable 10 in place within the ferrule 26. As shown in FIG. 5, the electroplating process, discussed below, has been performed, where a layer 50 of material is deposited around the end 40 of the ferrule 26 and around the fiber 14 where it extends out the end 40. The electroplating process can use any suitable material, including, but not limited to, nickel and copper, and can be flashed with gold to prevent corrosion. Because the sleeve bore 24 is open during the electroplating process at the opposite end, outgassing from the process does not affect the hermetic seal integrity of the ferrule 26. The layer 50 seals the opening through which the fiber 14 extends out of the ferrule 26 so that contamination from the environment does not enter the photonic device module through the bores 24, 28 and 30 in the ferrule 26. Once the electroplating process is complete, the sleeve 12 is slid back into the ferrule 12, and is optically soldered to the ferrule 26 at solder points 52, as shown in FIG. 6.

FIG. 7 is a simplified plan view of the process for electroplating the end 40 of the ferrule 26, as discussed above. In this diagram, the ferrule and cable assembly, as shown in FIG. 4, is inserted into a tank 60 holding an electrolyte 62. A first electrode 64 made of the electroplating material is inserted into the tank 60, and is electrically connected to a positive terminal of a voltage source 66. A second electrode 68 is coupled to the negative terminal of the source 66. The source 66 is activated, and material from the electrode 64 is transferred to the electrode 68 through the electrolyte 62. Because the current density is very high around the edge of the fiber bore 28, electroplating is performed faster at this location. The electroplating process coaxially and hermetically seals the gap between the ferrule 26 and the fiber core 28. The process is performed at a temperature typically about 60° C., which is well below the threshold temperature that causes fiber jacket damage.

As discussed above, the invention includes cold welding or electroplating an end of a ferrule to hermetically seal an opening in the ferrule around a fiber extending out of the ferrule. FIG. 7 and the related text describes the electroplating process to form the layer 50. In a practical environment, it would be desirable to accurately limit the area of the end 40 of the ferrule 26 that is electroplated, and simultaneously electroplate many ferrule and fiber cable assemblies. According to another embodiment of the present invention, a cold welding fixture is provided to perform this process.

FIG. 8 is an exploded perspective view and FIG. 9 is a reverse exploded perspective view of a cold welding fixture 70 used for this purpose, according to an embodiment of the present invention. FIGS. 10–14 show various views of assembled components of the fixture 70, and FIG. 15 is a perspective view of the assembled fixture 70. In this embodiment, the fixture 70 is able to simultaneously electroplate eighteen ferrule and fiber optic cable assemblies 72, six of which are shown, each including a ferrule 74 and a fiber 76. However, in other embodiments, many more assemblies 72 can be simultaneously electroplated.

As will be discussed in detail below, the fixture 70 includes a base plate 78 including a lower disc portion 82 and an upper disc portion 82 that are concentric with each other and define a rim 84 therebetween. The fixture 70 further includes two test plates 86 and 88, a main body 90 and a cover 92 including opposing semicircular cover sections 94 and 96.

The test plates 86 and 88 are secured by bolts 98 within extended cavities 100 and 102, respectively, formed in a bottom surface 106 of a body platform 108 and defined in a recess 110 of the body 90. The test plates 86 and 88 provide a calibration for the current distribution to set the thickness of the layer 50. The main body 90 is then positioned on the base plate 78 so that a bottom edge 114 of the main body 90 rests on set screws extending through the rim 84, and the upper disc portion 82 of the base plate 78 extends into the recess 110. An O-ring 116 is positioned within a circular groove 118 formed in the platform 108 of the body 90, as shown.

The assemblies 72 are then inserted into specially designed openings 120 extending through the platform 108 that match the shape of the ferrule 74. The assemblies 72 extend through the openings 120 until the fibers 76 contact a top surface 122 of the upper portion 82 of the base plate 78. In this position, the ferrule 74 is pressed against an edge of the opening 120 so that only a portion of the end of the ferrule protrudes into the recess 110. A recess 124 in the top of the platform 108 accommodates the electrodes for the electroplating process.

An inside edge of the cover sections 94 and 96 include a resilient material, such as rubber strips 126 and 128. The cover sections 94 and 96 are then positioned on top of the main body 90 against the O-ring 116 so that the optic cables are positioned against the rubber strips 126 and 128. Screws are then threaded through holes 130 in the cover sections 94 and 96 to secure them to the main body 90. The fixture 70 is then immersed in an electroplating bath to provide the electroplating layer 50 on the assemblies 72 as discussed above.

Figure 16:
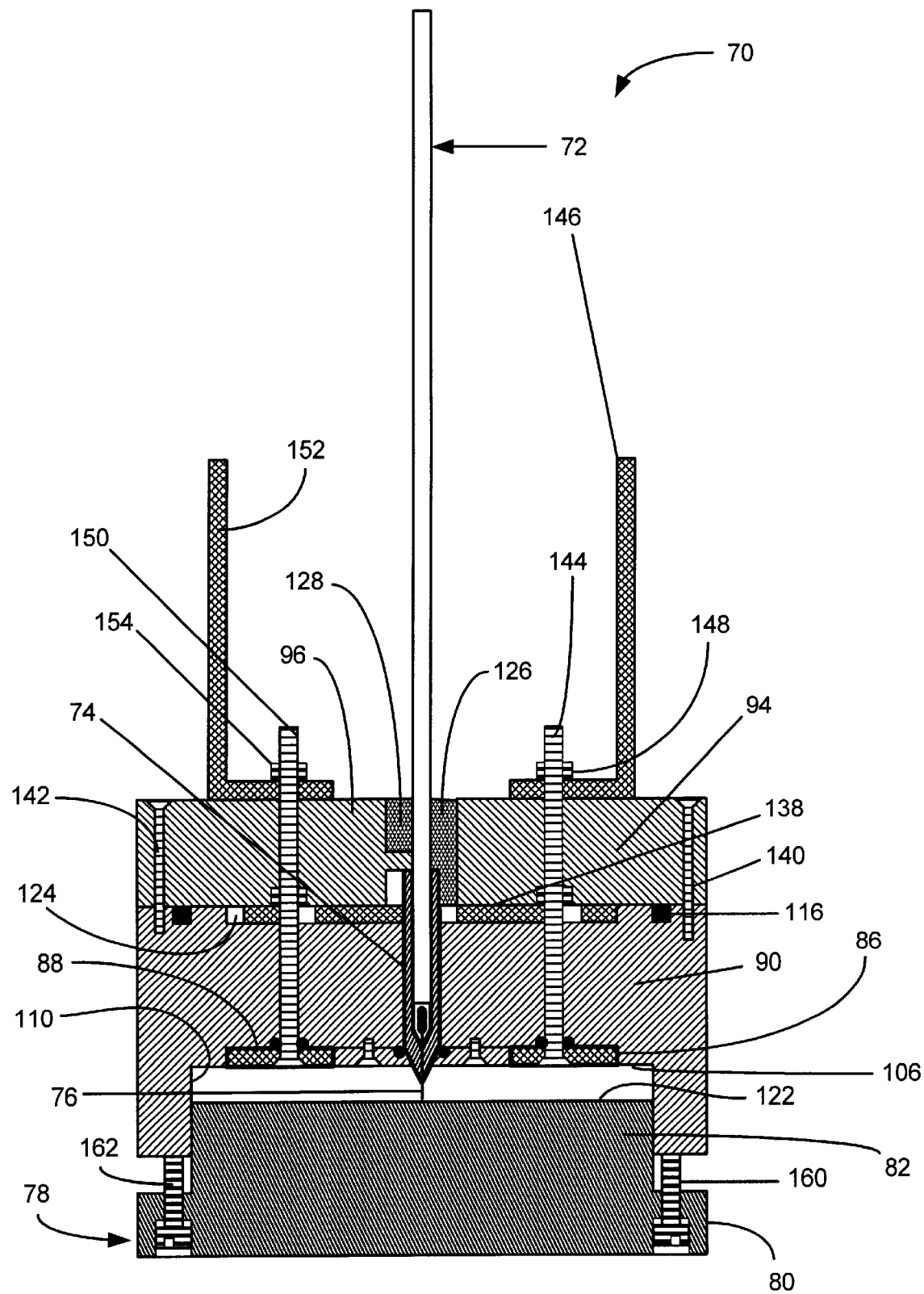
FIG. 16 is a cross-sectional view of the assembled fixture of the invention, and including a fiber optic cable and ferrule assembly.

FIG. 16 is a cross-sectional view of the cold welding fixture 70, showing one of the assemblies 72 mounted therein. Electrodes 138 are positioned within the recess 124, as mentioned above. Bolts 140 and 142 threaded through the holes 130 are used to secure the cover sections 94 and 96 to the main body 90, and to hold the electrodes 138 in place. A bolt 144 extends through the test plate 86, the main body 90 and the cover section 94, and secures an L-shaped electrode 146 to a top surface of the cover section 94 by a nut 148, as shown. Likewise, a bolt 150 extends through the test plate 88, the main body 90 and the cover section 96, and secures an L-shaped electrode 152 to a top surface of the cover section 96 by a nut 154, as shown. During electroplating, the electrodes 146 and 152 are electrically coupled to the power source 66 to provide electrical current to the electrodes 138 in the recess 124, and to the test plates 86 and 88. Thus, electroplating is provided from the test plates 86 and 88 to the tip of the ferrule 74.

The gap between the surface 106 and the surface 122 in the recess 110 is set by set screws 160 and 162 threaded through the rim 84. Thus, the edge 114 rests on the set screws 160 and 162 so that the end of the fiber 76 just touches the top surface 122. Thus, the gap can be set for different length fibers extending from the ferrule 74.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method of assembling a fiber optic cable to a ferrule comprising:
   sliding the fiber optic cable into a sleeve;
   inserting the sleeve with the fiber cable through a first end of the ferrule into a ferrule bore so that a fiber of the cable extends out of a second end of the ferrule through a second end of the ferrule through a fiber bore;
   sliding the sleeve out of the ferrule; and
   electroplating the second end of the ferrule so that an opening defined between the fiber and the fiber bore is sealed and the cable is secured to the ferrule.

2. The method according to claim 1 further comprising sliding the sleeve back into the ferrule after the second end of the ferrule has been electroplated.

3. The method according to claim 2 further comprising soldering the sleeve to the ferrule to secure it thereto.

4. The method according to claim 1 wherein electroplating the second end of the ferrule includes electroplating the second end of the ferrule with a material selected from the group consisting of copper, nickel and gold.

5. A method according to claim 1 further comprising mounting the fiber cable and ferrule assembly within a fixture and positioning the fixture within an electroplating bath.

6. A method of assembling a fiber optic cable to a ferrule comprising:
   sliding the fiber optic cable into a sleeve where the cable is held within a predetermined location of the sleeve so that an end of the fiber is flush with an end of the sleeve;
   inserting the sleeve with the fiber cable through a first end of the ferrule into a ferrule bore so that a fiber of the cable extends out of a second end of the ferrule through a second end of the ferrule through a fiber bore;
   sliding the sleeve out of the ferrule;
   electroplating the second end of the ferrule so that an opening defined between the fiber and the fiber bore is sealed and the cable is secured to the ferrule; and
   sliding the sleeve back into the ferrule where the sleeve is optically soldered to the ferrule.

7. The method of claim 6 wherein electroplating the second end of the ferrule includes electroplating the second end of the ferrule with a material selected from the group consisting of copper, nickel and gold.

8. The method according to claim 6 further comprising mounting the fiber cable and ferrule assembly within a fixture and positioning the fixture for electroplating.

9. The method of assembling a fiber optic cable to a ferrule comprising;
   forming a buffer layer and a fiber jacket layer over the fiber optic cable;
   sliding the fiber optic cable into a sleeve where the cable is held within a predetermined location so that an end of the fiber is flush with an end of the sleeve;
   inserting the sleeve with fiber optic cable into a sleeve bore through a first end of the ferrule into a ferrule bore so that a fiber of the cable extends out of a second end of the ferrule through a second end of the ferrule through a fiber bore;
   forcing the sleeve with the fiber optic cable into the sleeve bore so that the end of the sleeve contacts an edge of the ferrule;
   sliding the sleeve out of the ferrule; and
   forming a plating layer over the second end of the ferrule and around a portion of the fiber extending out of the ferrule so that an opening defined between the fiber bore and the fiber is sealed by the plating layer.

10. The method assembly according to claim 9 further comprising soldering the sleeve to the ferrule to secure it thereto.

11. The method assembly according to claim 10 wherein the cable extends from the buffer layer a predetermined amount so that the buffer layer abuts the tapered bore.

12. The method assembly according to claim 9 wherein the sleeve bore and the fiber bore are connected by a tapered bore.

13. The method assembly according to claim 9 wherein the sleeve is made of a material selected from the group consisting of glass, metal and ceramic.

14. The method assembly according to claim 9 wherein the buffer layer is made of a material selected from the group consisting of metal, metalized glass and ceramic.

15. The method assembly according to claim 9 wherein the fiber jacket layer is made of a material selected from the group consisting of metal, metalized glass and ceramic.

* * * * *